(12) United States Patent
Umano et al.

(10) Patent No.: US 12,241,804 B2
(45) Date of Patent: Mar. 4, 2025

(54) SEMICONDUCTOR PRESSURE SENSOR AND PRESSURE SENSOR DEVICE

(71) Applicant: Mitsubishi Electric Corporation, Tokyo (JP)

(72) Inventors: Mitsuhiro Umano, Tokyo (JP); Hirofumi Konishi, Tokyo (JP); Mayumi Fujiwara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 546 days.

(21) Appl. No.: 17/485,750

(22) Filed: Sep. 27, 2021

(65) Prior Publication Data

US 2022/0316972 A1 Oct. 6, 2022

(30) Foreign Application Priority Data

Mar. 30, 2021 (JP) .................................. 2021-056750

(51) Int. Cl.
*G01L 9/00* (2006.01)
(52) U.S. Cl.
CPC .................................. *G01L 9/0052* (2013.01)
(58) Field of Classification Search
CPC ...... G01L 9/0052; G01L 9/0054; Y02E 60/50
See application file for complete search history.

(56) References Cited

U.S. PATENT DOCUMENTS

| | | | | |
|---|---|---|---|---|
| 2012/0060605 | A1* | 3/2012 | Wu | G01L 9/0073 73/514.11 |
| 2013/0062713 | A1* | 3/2013 | Sakuragi | G01L 9/0054 257/419 |
| 2017/0113917 | A1* | 4/2017 | Yoshikawa | G01L 9/0048 |
| 2020/0408629 | A1* | 12/2020 | Pierschel | G01L 9/0042 |

FOREIGN PATENT DOCUMENTS

| | | |
|---|---|---|
| JP | 2000-133817 A | 5/2000 |
| JP | 2017-083187 A | 5/2017 |

* cited by examiner

*Primary Examiner* — Benjamin Tzu-Hung Liu
(74) *Attorney, Agent, or Firm* — Sughrue Mion, PLLC

(57) ABSTRACT

This semiconductor pressure sensor includes: a first semiconductor substrate; a second semiconductor substrate; and a first piezoresistance element and a second piezoresistance element provided in the second semiconductor substrate. A first recess and a second recess are formed on the first semiconductor substrate, and a first cavity surrounded by the first recess and the second semiconductor substrate and a second cavity surrounded by the second recess and the second semiconductor substrate are formed. The first piezoresistance element is formed at a position overlapping an outer periphery of the first cavity or a position inward of the outer periphery of the first cavity. The second piezoresistance element is formed at a position overlapping an outer periphery of the second cavity, a position overlapping an inner periphery of the second cavity, or a position inward of the outer periphery and outward of the inner periphery of the second cavity.

15 Claims, 12 Drawing Sheets

SEMICONDUCTOR PRESSURE SENSOR AND PRESSURE SENSOR DEVICE

BACKGROUND OF THE INVENTION

1. Field of the Invention

The present disclosure relates to a semiconductor pressure sensor and a pressure sensor device.

2. Description of the Background Art

In a fuel cell system of a type to be mounted on a fuel cell vehicle or the like, a fuel cell stack capable of generating high voltage is used. The fuel cell stack is formed such that a fuel cell stacked body is held between insulating plates, current collecting plates, end plates, and the like. The fuel cell stacked body is obtained by stacking multiple fuel cells. One fuel cell set is generally composed of separators and a membrane electrode assembly (MEA) formed of an anode-side electrode, an electrolyte membrane, and a cathode-side electrode.

In the fuel cell stack, fuel gas (e.g., hydrogen gas) is supplied to the anode side and oxygen gas (e.g., air) is supplied to the cathode side, so that cell reaction occurs, an electromotive force is generated, and water is generated on the cathode side. In order to perform this electric generation efficiently, it is necessary to accurately measure the amounts of hydrogen gas and air supplied to the fuel cell stack, and supply them while controlling these amounts so as not to be excessive or insufficient. A pressure sensor is used for control of the hydrogen gas.

However, the pressure sensor for measuring the pressure of hydrogen gas supplied to the fuel cell stack has many problems to be solved. The molecular size of hydrogen gas is about 37 pm in covalent radius and about 120 pm in van der Waals radius, and thus is extremely small. The hydrogen gas enters the pressure sensor in a gas molecule state, or enters the pressure sensor in an ionized state and then is bonded again, for example, and therefore has property of readily penetrating through various materials. This property makes it difficult to perform accurate pressure measurement.

Various parts composing a fuel cell system have not been made appropriate in specifications and costs yet, and cost reduction is an urgent issue for spreading fuel cell vehicles. Therefore, it is desirable to use an inexpensive semiconductor pressure sensor that can be mass-produced, for the cell system. In a conventional semiconductor pressure sensor for which air is assumed as a measurement medium, for example, a diaphragm is formed using a single crystal silicon substrate, and a glass substrate is used as a seating for sealing a cavity. Therefore, the conventional semiconductor pressure sensor has characteristics of low cost, high accuracy, and high reliability. However, the conventional semiconductor pressure sensor is not assumed to be used for the fuel cell system, and thus sufficient measures against the hydrogen penetration problem in the semiconductor pressure sensor have not been taken.

In a case of using the conventional semiconductor pressure sensor for measuring the pressure of hydrogen gas in the fuel cell system, hydrogen gas readily penetrates through a silicon oxide film and a glass substrate, and therefore accurate pressure measurement cannot be performed. The hydrogen diffusion coefficients of many materials increase exponentially under a high-temperature high-pressure environment as in the fuel cell system, as compared to a room-temperature atmospheric-pressure environment. Therefore, such a phenomenon becomes more significant when the temperature and the pressure of the hydrogen gas are high. Further, the inside of the cavity is made vacuum for the purpose of measuring the absolute pressure. Therefore, there is a pressure difference between the inside and the outside of the cavity, and thus the hydrogen gas readily enters the cavity. If hydrogen enters the inside of the cavity, the pressure in the cavity increases and the output of the pressure sensor varies. Therefore, is difficult to accurately measure the pressure of hydrogen gas with the conventional semiconductor pressure sensor. In addition, as semiconductor pressure sensors have had an increasingly fine and increasingly integrated structure in recent years, the volume of the cavity is also further downsized. Therefore, even if the amount of hydrogen gas entering the cavity is extremely small, increase in the pressure of the cavity is significantly great, and thus the influence of hydrogen penetration becomes more serious.

In a semiconductor pressure sensor manufactured by joining semiconductor substrates, a configuration for trapping gases such as hydrogen and oxygen generated when the semiconductor substrates are joined is disclosed (see, for example, Patent Document 1). In the disclosed semiconductor pressure sensor, a cavity is formed by joining a first semiconductor substrate having a diaphragm and a second semiconductor substrate to each other in vacuum. The semiconductor pressure sensor has a trap chamber at the joining interface between the first semiconductor substrate and the second semiconductor substrate. At the trap chamber, gases such as hydrogen and oxygen generated when the first semiconductor substrate and the second semiconductor substrate are joined are trapped.

Patent Document 1: Japanese Laid-Open Patent Publication No. 2000-133817

In the structure of the semiconductor pressure sensor in Patent Document 1, since the trap chamber is provided at the joining interface between the first semiconductor substrate and the second semiconductor substrate, hydrogen gas generated in a heat treatment process can be prevented from entering the inside of the cavity when transferring through the interface between both substrates. However, in a case where the disclosed semiconductor pressure sensor made from a single crystal silicon material is used for measuring the pressure of hydrogen gas in the fuel cell system, the hydrogen penetration phenomenon cannot be perfectly eliminated, and therefore it is difficult to prevent entry of hydrogen into the cavity. The reason will be described below.

In the disclosed semiconductor pressure sensor, the joining part formed by joining between the first semiconductor substrate and the second semiconductor substrate is exposed to the outside at a side surface of the semiconductor pressure sensor. A plurality of semiconductor pressure sensors are manufactured with a wafer that is the single crystal silicon substrate, and the semiconductor pressure sensors are separated into individual pieces by dicing. In manufacturing of the semiconductor pressure sensors using a semiconductor process, exposure of the joining part to the outside cannot be avoided. A silicon oxide film formed at the joining part in order to promote joining between two wafers is a material that allows penetration of hydrogen gas more readily as compared to silicon. Therefore, the joining part of the semiconductor pressure sensor serves as a penetration path through which hydrogen gas having a small molecular size enters the inside of the cavity from the side surface.

The disclosed semiconductor pressure sensor has no measures taken against such hydrogen penetration through the penetration path. There is a problem that, if hydrogen gas enters through the penetration path into the cavity in which the vacuum state should be maintained for measurement of the absolute pressure, and thus the degree of vacuum in the cavity decreases, the semiconductor pressure sensor becomes unable to accurately measure the pressure of the hydrogen gas. Since the pressure cannot be measured accurately, reliability of measurement is lowered.

SUMMARY OF THE INVENTION

Accordingly, an object of the present disclosure is to provide a semiconductor pressure sensor having enhanced accuracy of pressure measurement for hydrogen gas.

A semiconductor pressure sensor according to the present disclosure includes: a first semiconductor substrate; a second semiconductor substrate joined to one surface of the first semi conductor substrate with an oxide film interposed therebetween; and a first piezoresistance element and a second piezoresistance element provided in one surface of the second semiconductor substrate on a side opposite to the first semiconductor substrate. A first recess and a second recess surrounding the First recess are formed on the one surface of the first semiconductor substrate, a first cavity is formed as a space surrounded by the first recess and another surface of the second semiconductor substrate, and a second cavity is formed as a space surrounded by the second recess and the other surface of the second semiconductor substrate. The first piezoresistance element is formed at a position overlapping an outer periphery of the first cavity or a position inward of the outer periphery of the first cavity, in the one surface of the second semiconductor substrate, as seen in a direction perpendicular to the one surface of the second semiconductor substrate. The second piezoresistance element is formed at a position overlapping an outer periphery of the second cavity, a position overlapping an inner periphery of the second cavity, or a position inward of the outer periphery and outward of the inner periphery of the second cavity, in the one surface of the second semiconductor substrate, as seen in the direction perpendicular to the one surface of the second semiconductor substrate.

In the semiconductor pressure sensor according to the present disclosure, the first recess and the second recess surrounding the first recess are formed on the one surface of the first semiconductor substrate, the first cavity is formed as a space surrounded by the first recess and the other surface of the second semiconductor substrate joined with the oxide film interposed, and the second cavity is formed as a space surrounded by the second recess and the other surface of the second semiconductor substrate. The first piezoresistance element is formed at a position overlapping an outer periphery of the first cavity or a position inward of the outer periphery of the first cavity, in the one surface of the second semiconductor substrate, as seen in the direction perpendicular to the one surface of the second semiconductor substrate. The second piezoresistance element is formed at a position overlapping an outer periphery of the second cavity, a position overlapping an inner periphery of the second cavity, or a position inward of the outer periphery and outward of the inner periphery of the second cavity, in the one surface of the second semiconductor substrate, as seen in the direction perpendicular to the one surface of the second semiconductor substrate. Therefore, when hydrogen gas penetrates through the oxide film, a difference arises between the pressures in the first cavity and the second cavity, and the difference between the pressures in the first cavity and the second cavity can be detected from the outputs of the first piezoresistance element and the second piezoresistance element. Thus, accuracy of pressure measurement for hydrogen gas can be enhanced.

DETAILED DESCRIPTION OF THE PREFERRED EMBODIMENTS OF THE INVENTION

Figure 1:
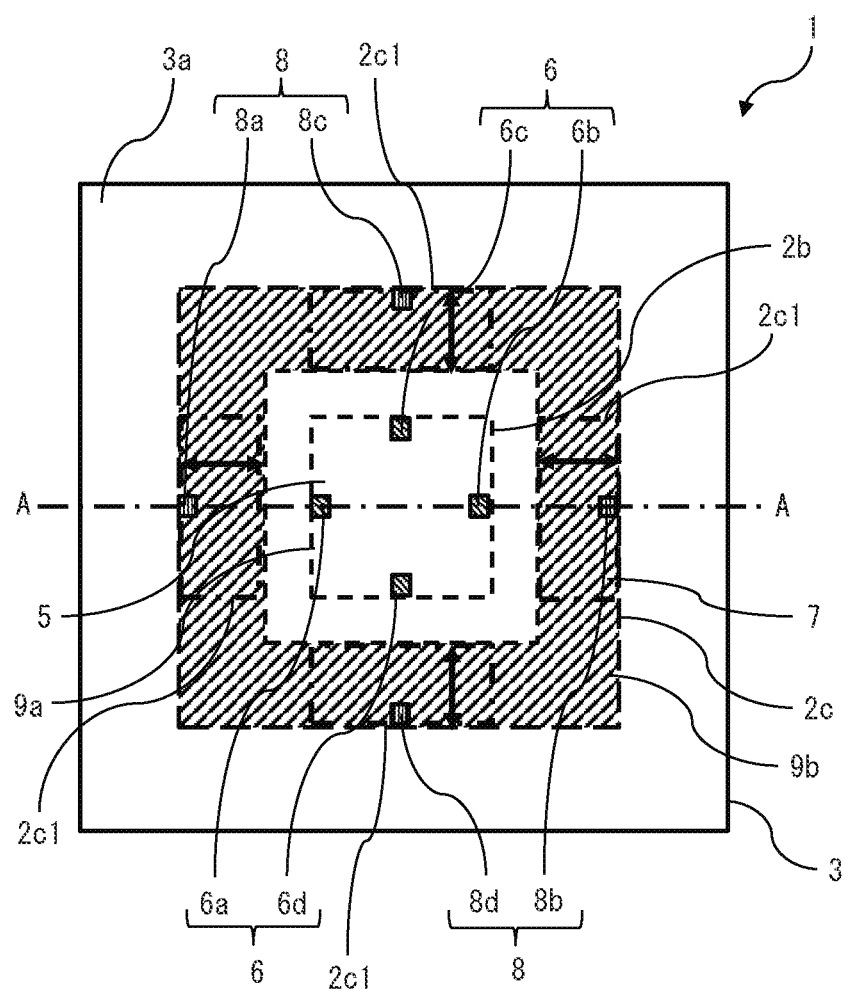
FIG. 1 is a plan view schematically showing a semiconductor pressure sensor according to the first embodiment of the present disclosure.

Hereinafter, a semiconductor pressure sensor according to embodiments of the present disclosure will be described with reference to the drawings. In the drawings, the same or corresponding members and parts are denoted by the same reference characters, to give description.

First Embodiment

Figure 2:
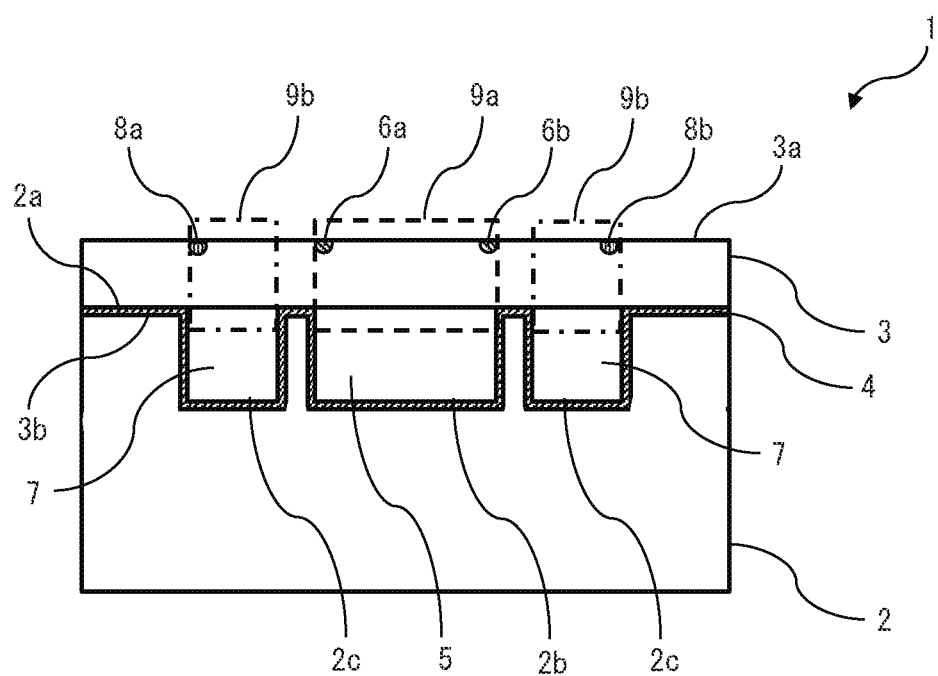
FIG. 2 is a sectional view schematically showing the semiconductor pressure sensor along line A-A in FIG. 1.
Figure 3:
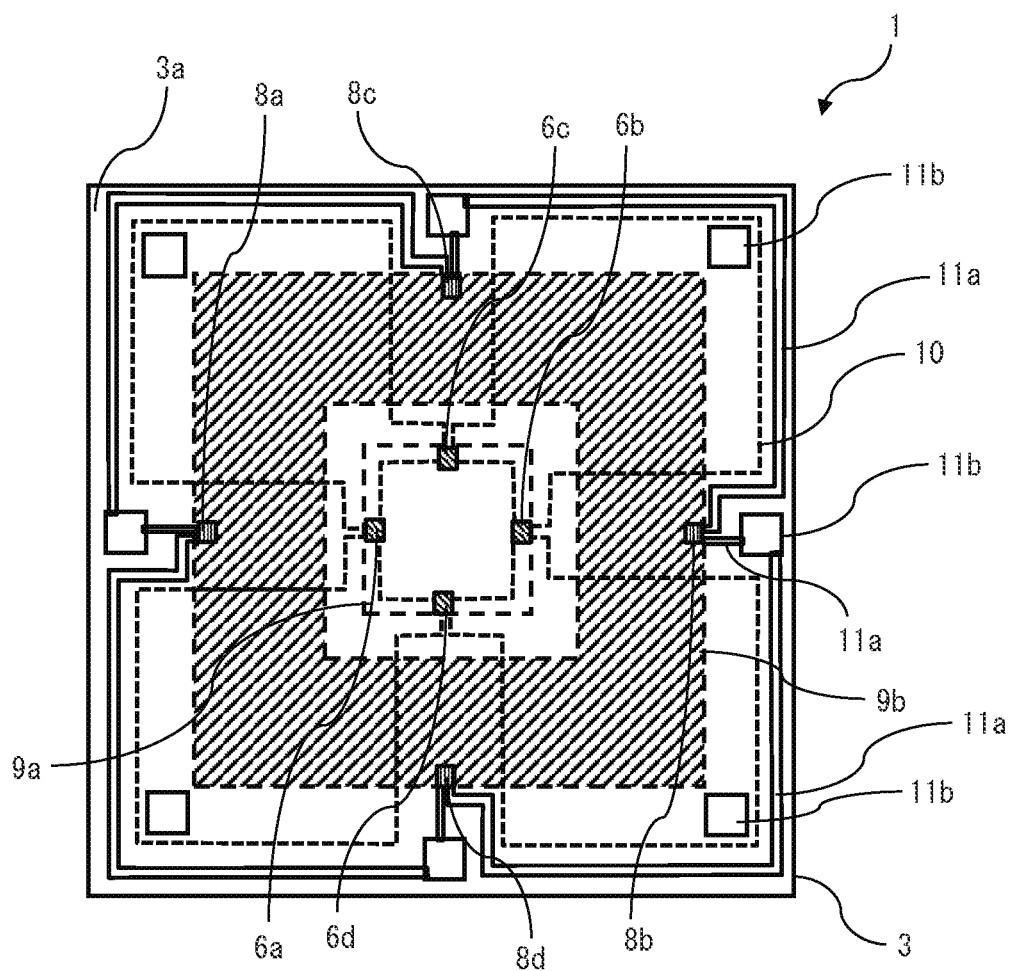
FIG. 3 is a plan view schematically showing the semiconductor pressure sensor according to the first embodiment.
Figure 4:
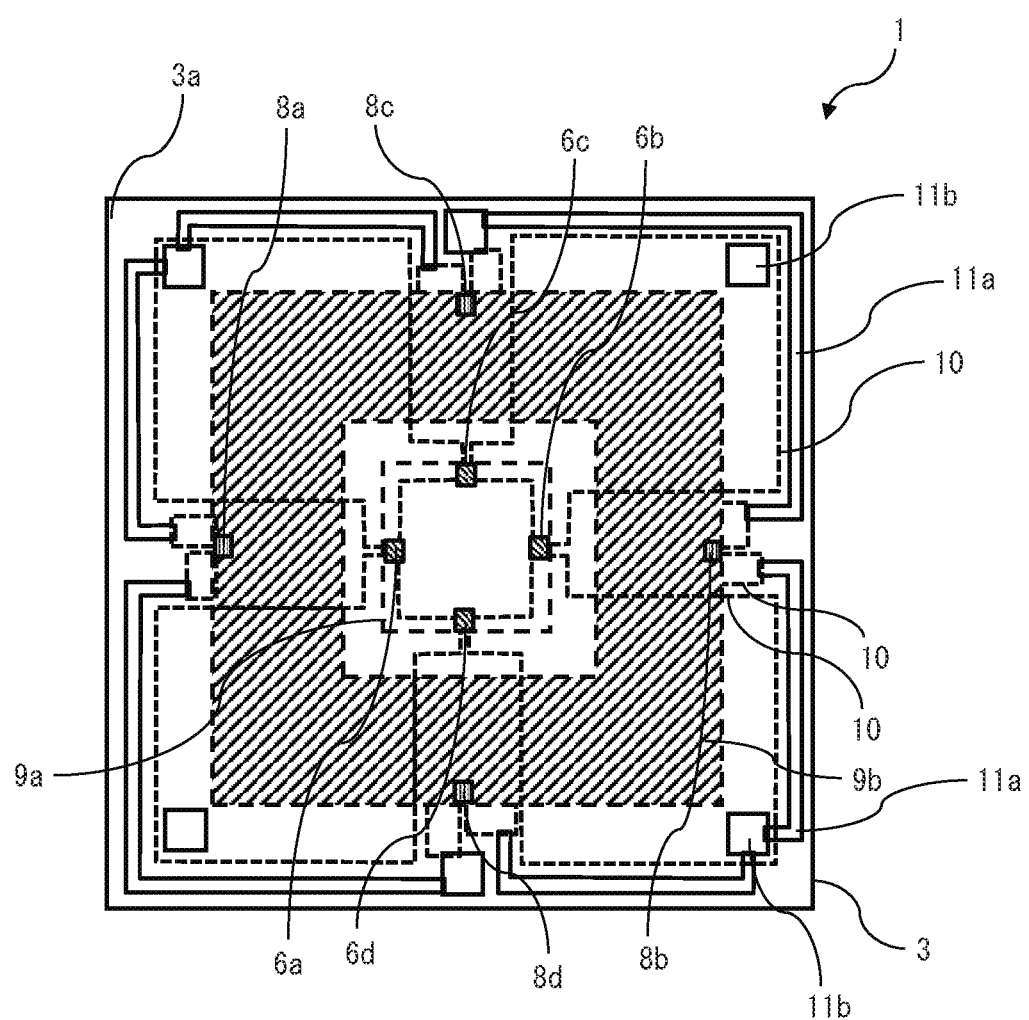
FIG. 4 is a plan view schematically showing another semiconductor pressure sensor according to the first embodiment.
Figure 5:
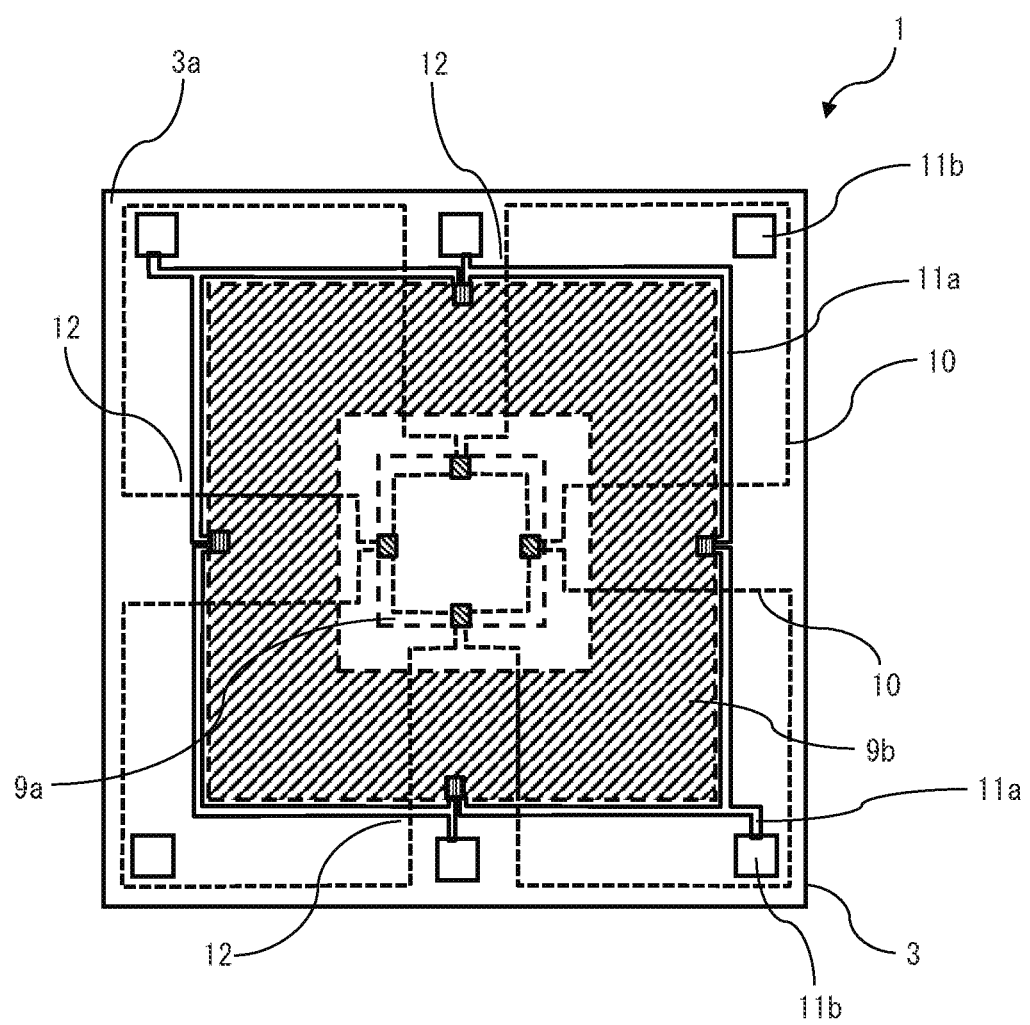
FIG. 5 is a plan view schematically showing still another semiconductor pressure sensor according to the first embodiment.
Figure 6:
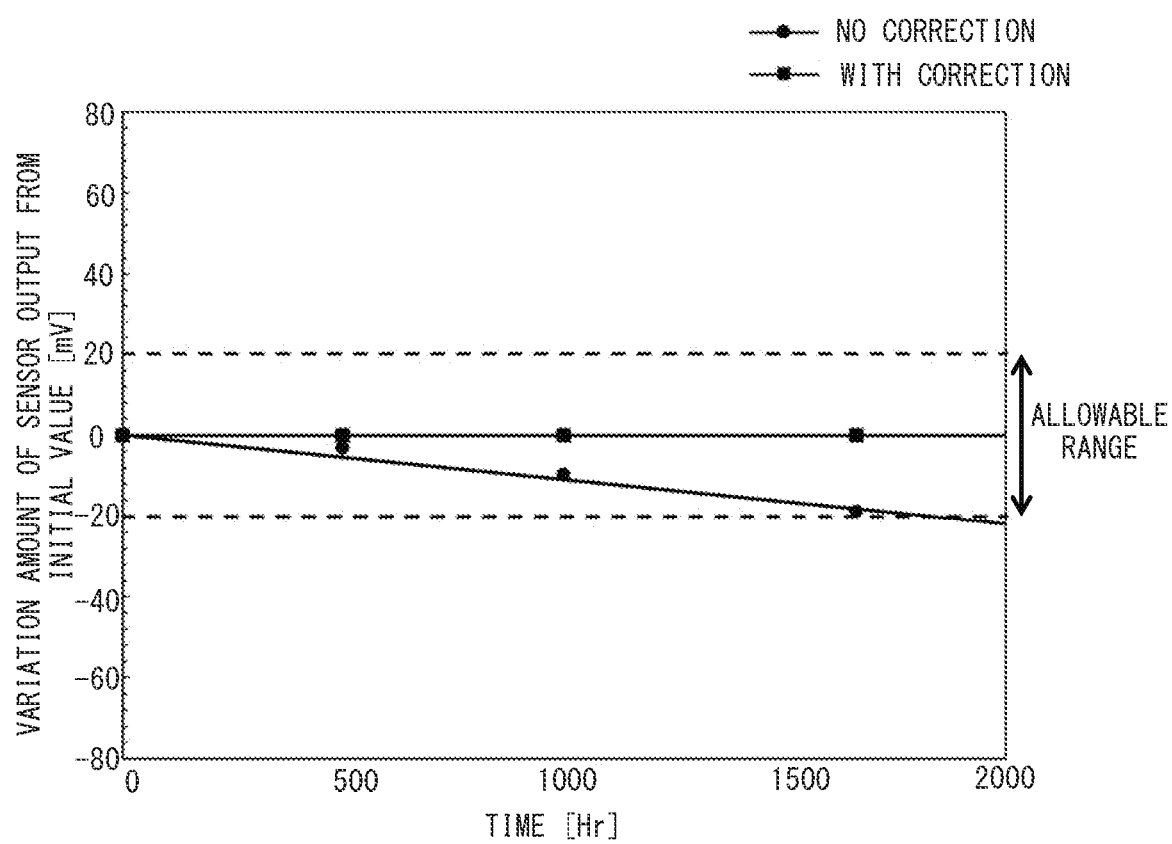
FIG. 6 shows the output variation amount of the semiconductor pressure sensor according to the first embodiment.
Figure 7:
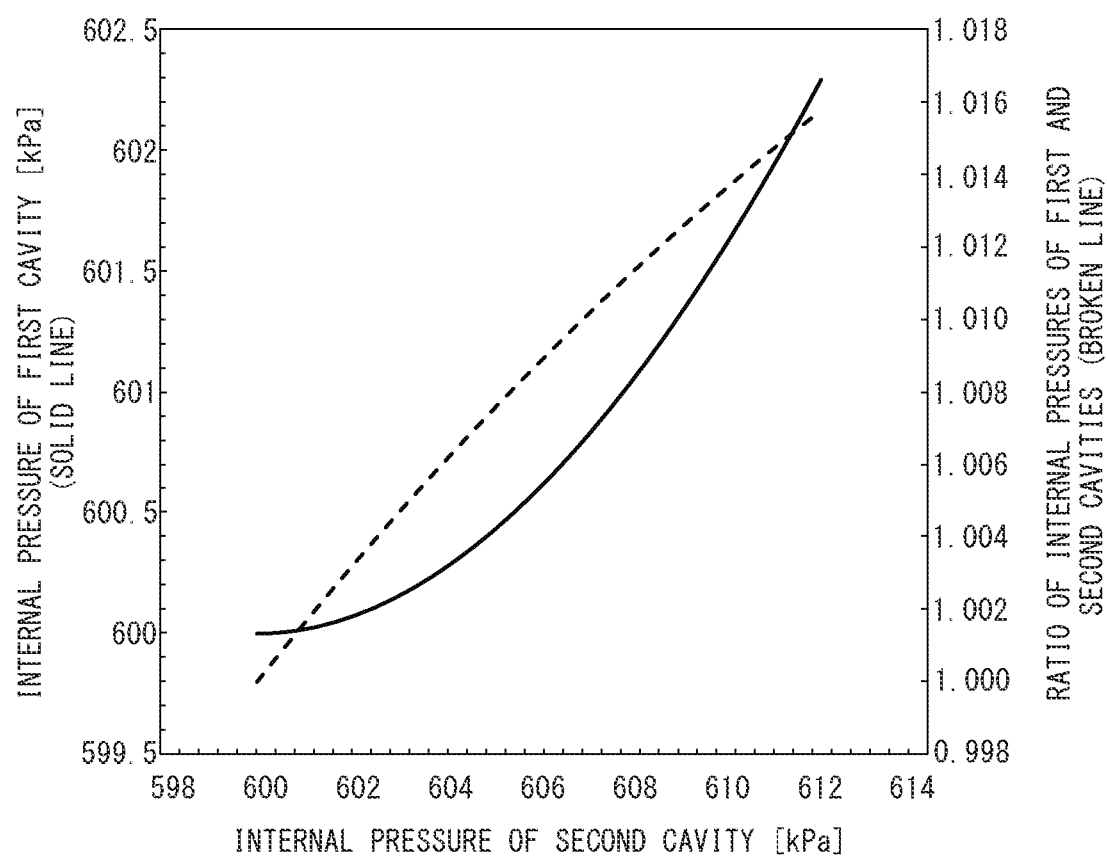
FIG. 7 shows the relationship of internal pressure changes in the first cavity and the second cavity of the semiconductor pressure sensor according to the first embodiment.
Figure 8:
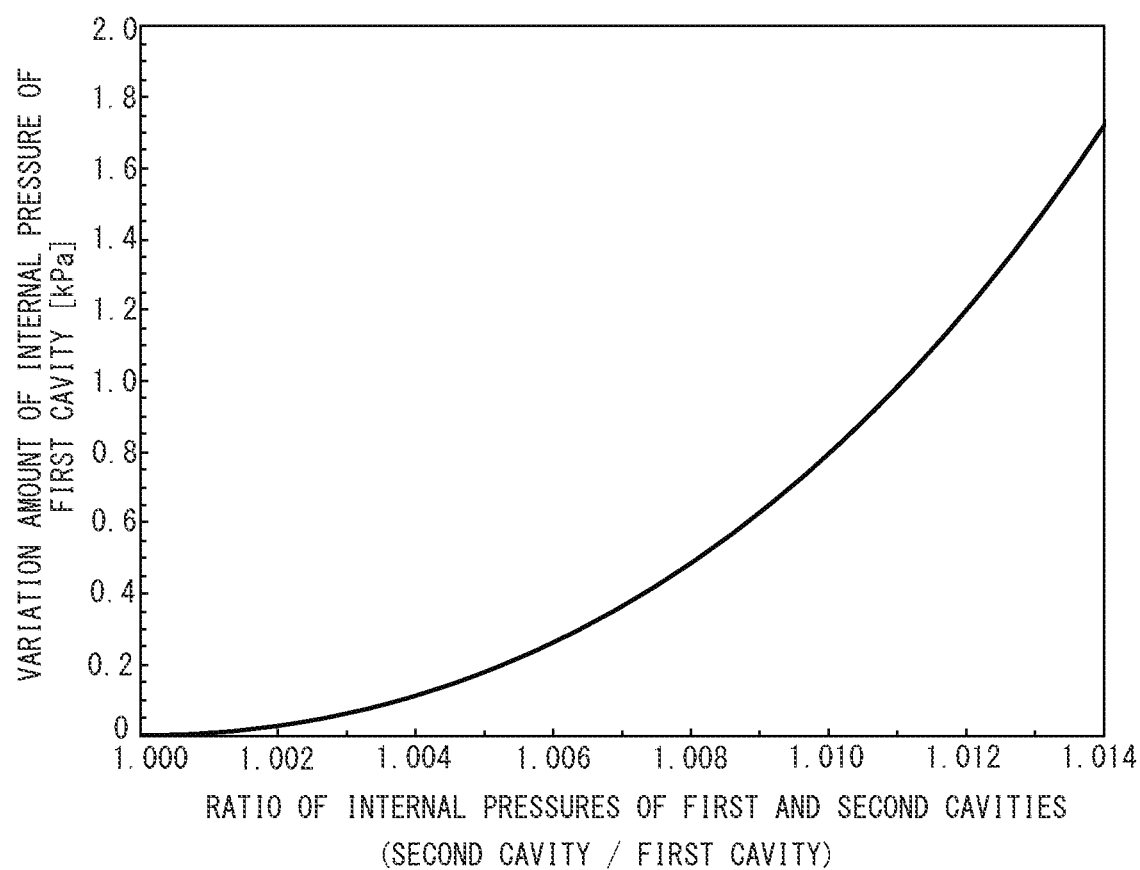
FIG. 8 is a graph for explaining a correction process of the semiconductor pressure sensor according to the first embodiment.
Figure 9:
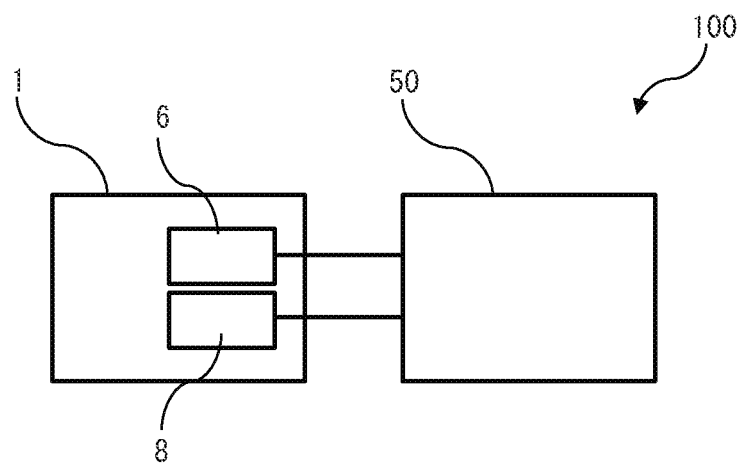
FIG. 9 shows the configuration of a pressure sensor device according co the first embodiment.
Figure 10:
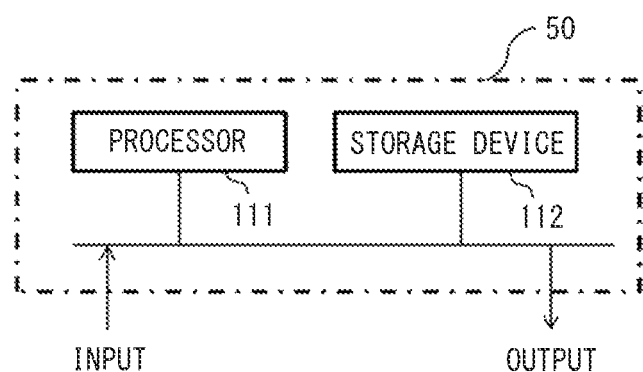
FIG. 10 is a configuration diagram showing an example of hardware of the pressure sensor device.
Figure 11:
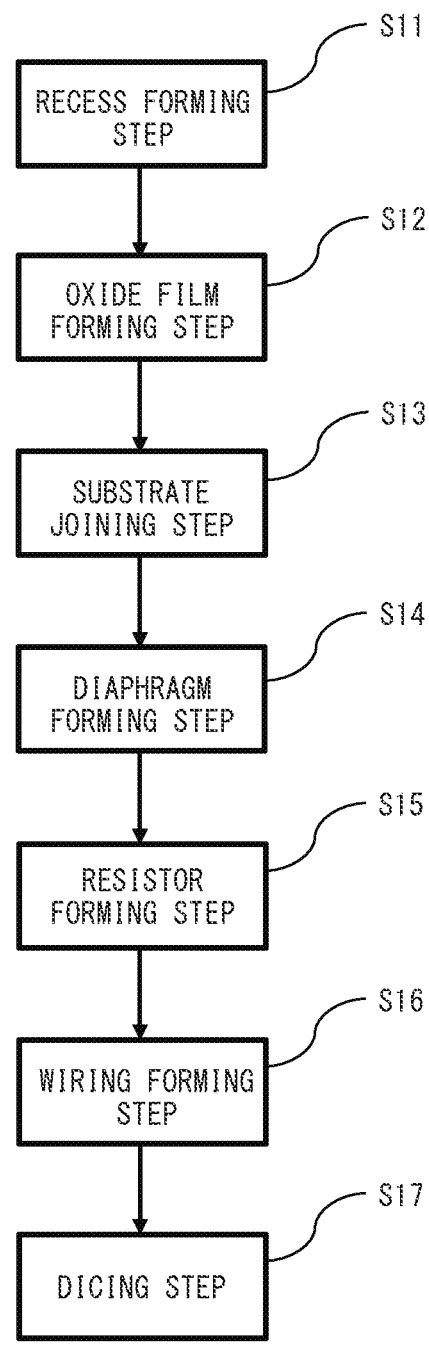
FIG. 11 is a chart showing a manufacturing process for the semiconductor pressure sensor according to the first embodiment.

FIG. 1 is a plan view schematically showing a semiconductor pressure sensor 1 according to the first embodiment of the present disclosure, with wiring not shown. FIG. 2 is a sectional view schematically showing the semiconductor pressure sensor along line A-A in FIG. 1. FIG. 3 is a plan view schematically showing the semiconductor pressure sensor 1 for explaining wiring. FIG. 4 is a plan view schematically showing another semiconductor pressure sensor according to the first embodiment, for explaining wiring. FIG. 5 is a plan view schematically showing still another semiconductor pressure sensor 1 according to the first embodiment, for explaining wiring. FIG. 6 shows the output variation amount of the semiconductor pressure sensor 1. FIG. 7 shows the relationship of internal pressure changes in a first cavity 5 and a second cavity 7 of the semiconductor pressure sensor 1. FIG. 8 is a graph for explaining a correction process of the semiconductor pressure sensor 1. FIG. 9 shows the configuration of a pressure sensor device 100. FIG. 10 is a configuration diagram showing an example of hardware of the pressure sensor device 100. FIG. 11 is a chart showing a manufacturing process for the semiconductor pressure sensor 1. The semiconductor pressure sensor 1 is manufactured through a semiconductor process, and is a sensor for measuring the pressure of hydrogen gas or gas containing hydrogen gas.

<Semiconductor Pressure Sensor 1>

The semiconductor pressure sensor 1 includes a first silicon substrate 2 which is a first semiconductor substrate, a second silicon substrate 3 which is a second semiconductor substrate joined to a main surface 2a which is one surface of the first silicon substrate 2 with a silicon oxide film 4 interposed therebetween, and a first piezoresistance element 6 and a second piezoresistance element 8 provided on a main surface 3a which is one surface of the second silicon substrate 3 on a side opposite to the first silicon substrate 2. On the main surface 2a of the first silicon substrate 2, a first recess 2b and a second recess 2c surrounding the first recess 2b are formed. The first recess 2b and the second recess 2c are formed in the thickness direction of the first silicon substrate 2. The second silicon substrate 3 is joined so as to cover the first recess 2b and the second recess 2c. In the present embodiment, the first recess 2b is formed in a rectangular shape as seen in the direction perpendicular to the main surface 3a of the second silicon substrate 3. The second recess 2c is formed in a rectangular loop shape as seen in the direction perpendicular to the main surface 3a of the second silicon substrate 3. The shapes of the first recess 2b and the second recess 2c are not limited thereto, and may be formed in a round shape and an annular shape, for example. In a case of forming the first recess 2b and the second recess 2c in a rectangular shape and a rectangular loop shape, the first recess 2b and the second recess 2c can be formed easily and precisely through the semiconductor process.

The main surface 3a of the second silicon substrate 3 is a pressure receiving surface of the semiconductor pressure sensor 1. As the First silicon substrate 2 and the second silicon substrate 3, single crystal silicon substrates are used, and the second silicon substrate 3 is a deformable and thin substrate. The first cavity 5 is formed by a space surrounded by the first recess 2b and a main surface 3b which is another surface of the second silicon substrate 3. The second cavity 7 is formed by a space surrounded by the second recess 2c and the main surface 3b of the second silicon substrate 3. In FIG. 1, the first cavity 5 is formed in a part enclosed by a broken line at the center, and the second cavity 7 is formed in a hatched part. Providing such two cavities to the semiconductor pressure sensor 1 enables enhancement of accuracy of pressure measurement for hydrogen gas. The details of enhancement of accuracy of pressure measurement for hydrogen gas will be described later.

The first piezoresistance element 6 is formed at a position overlapping the outer periphery of the first cavity 5 or a position inward of the outer periphery of the first cavity 5, in the main surface 3a of the second silicon substrate 3, as seen in the direction perpendicular to the main surface 3a of the second silicon substrate 3. The second piezoresistance element 8 is formed at a position overlapping the outer periphery of the second cavity 7, a position overlapping the inner periphery of the second cavity 7, or a position inward of the outer periphery and outward of the inner periphery of the second cavity 7, in the main surface 3a of the second silicon substrate 3, as seen in the direction perpendicular to the main surface 3a of the second silicon substrate 3.

In the present embodiment, the first piezoresistance element 3 is formed at a position inward of the outer periphery of the first cavity 5 and adjacent to the outer periphery of the first cavity 5, in the main surface 3a of the second silicon substrate 3, as seen in the direction perpendicular to the main surface 3a of the second silicon substrate 3. The second piezoresistance element 8 is formed at a position inward of the outer periphery of the second cavity 7 and adjacent to the outer periphery of the second cavity 7, in the main surface 3a of the second silicon substrate 3, as seen in the direction perpendicular to the main surface 3a of the second silicon substrate 3. As shown in FIG. 1, as the first piezoresistance element 6, first piezoresistance elements 6a, 6b, 6c, 6d are provided at the above-described positions at the respective sides of the our periphery of the rectangular first cavity 5 as seen in the direction perpendicular to the main surface 3a of the second silicon substrate 3. The second recess 2c has four partial areas 2c1 located outward of the respective sides of the first recess 2b and having lengths corresponding to the respective sides of the first recess 2b. In FIG. 1, parts enclosed by dotted-dashed lines are the partial areas 2c1. The four partial areas 2c1 have widths equal to each other (widths indicated by arrows in FIG. 1). As the second piezoresistance element 8, second piezoresistance elements 8a, 8b, 8c, 8d are provided at positions inward of the respective outer peripheries of the four partial areas 2c1 and adjacent to the respective outer peripheries of the four partial areas 2c1, in the main surface 3a of the second silicon substrate 3, as seen in the direction perpendicular to the main surface 3a of the second silicon substrate 3.

In FIG. 2, a part of the second silicon substrate 3 that is opposed to the first cavity 5 (part enclosed by a broken line in FIG. 2) corresponds to the cross section of a diaphragm 9a. A part of the second silicon substrate 3 that is opposed to the second cavity 7 (part enclosed by a dotted-dashed line in FIG. 2) corresponds to the cross section of a diaphragm 9b. The diaphragms 9a, 9b are pressure receiving portions that are deformable. The diaphragms 9a, 9b flex in accordance with the received pressures, so as to have strains caused particularly at the parts where the first piezoresistance element 6 and the second piezoresistance element 8 are located. The degrees of strains, i.e., the pressure-sensitive characteristics are determined by the sizes and the thicknesses of the diaphragms 9a, 9b. In the diaphragms 9a, 9b, the thickness of the second silicon substrate 3 mainly corresponds to the thicknesses of the diaphragms 9a, 9b. In FIG. 1, a part where the first cavity 5 is formed corresponds to the diaphragm 9a, and a part where the second cavity 7 is formed corresponds to the diaphragm 9b.

When a pressure is applied to the main surface 3a of the second silicon substrate 3, the diaphragm 9a flexes in accordance with a difference between the pressures of the first cavity 5 and the outside. Similarly, the diaphragm 9b flexes in accordance with a difference between the pressures of the second cavity 7 and the outside. Along with this, strains occur at the parts where each first piezoresistance element 6 and each second piezoresistance element 8 are located. In accordance with the degrees of strains that have occurred, the resistance values of the first piezoresistance element 6 and the second piezoresistance element 8 vary. Each resistance value is converted to an electric signal to be outputted, and the outputted electric signal is taken to the outside from a metal pad 11b which is an electrode pad via a diffused wiring layer 10 which is a diffused resistor and a metal wiring layer 11a which is metal. The positions of the first piezoresistance element 6 and the second piezoresistance element B shown in FIG. 1 are such positions where great strains can be obtained.

<Wiring Structure of Semiconductor Pressure Sensor 1>

With reference to FIG. 3, the wiring of the semiconductor pressure sensor 1 will be described. The semiconductor pressure sensor 1 has a plurality of metal pads 11b at the main surface 3a of the second silicon substrate 3. Each metal pad 11b is a part connecting the wiring of the semiconductor pressure sensor 1 and the outside. The first piezoresistance element 6 and the metal pad 11b are connected via first wiring formed by the diffused wiring layer 10. The second piezoresistance element 8 and the metal pad 11b are connected via second wiring formed by the diffused wiring layer 10 or the metal wiring layer 11a. In FIG. 3, the wiring formed by the diffused wiring layer 10 is indicated by a broken line, and the wiring formed by the metal wiring layer 11a is indicated by a solid line. In the present embodiment, the second piezoresistance element 8 and the metal pad 11b are connected via the second wiring formed by the metal wiring layer 11a, but the connection manner is not limited thereto. As shown in FIG. 4, the second piezoresistance element 8 and the metal pad 11b may be connected via second wiring formed partially by the diffused wiring layer 10. In a case of forming wiring by the metal wiring layer 11a, the wiring can be easily formed through the semiconductor process.

In a case where it is impossible to provide the metal pad 11b in an area between the diaphragm 9a and the diaphragm 9b from the standpoint of reducing the size of the semiconductor pressure sensor 1, a wiring layer for connecting the first piezoresistance element 6 and the metal pad 11b is to be formed in the area of the diaphragm 9b. It is possible to arbitrarily select the type of the wiring layer to design the wiring of the semiconductor pressure sensor 1. If the metal wiring layer 11a is provided in the area of the diaphragm 9b, stress is applied to the metal wiring layer 11a due to deformation of the diaphragm 9b, and therefore there is a concern that the wiring is damaged. In order to avoid damage to the wiring, it is preferable to form the wiring by the diffused wiring layer 10 which is less influenced by stress.

In the wiring shown in FIG. 4, the first piezoresistance element 6 and the metal pad 11b are connected via the diffused wiring layer 10, and the second piezoresistance element 8 and the metal pad 11b are connected via the diffused wiring layer 10 and the metal wiring layer 11a. In a case of providing the wiring by the diffused wiring layer 10, the wiring can be less influenced by stress due to deformation of the diaphragms 9a, 9b. Since the wiring is less influenced by stress, the durability of the wiring is improved, whereby deterioration of the wiring over time can be suppressed.

The layout of the metal pads 11b and the wiring shown in FIG. 3 is merely an example, and these can be freely arranged in consideration of, for example, simplification of a manufacturing process such as wire bonding. As shown in FIG. 4, the metal pads 11b may be shared for a power supply and the ground for the first piezoresistance element 6 and the second piezoresistance element 8. By sharing the power supply and the ground for the first piezoresistance element 6 and the second piezoresistance element 8, the number of metal pads 11b can be decreased. Since the number of metal pads 11b is decreased, the degree of freedom in designing can be improved and the manufacturing man-hours can be reduced.

At least parts of the diffused wiring layer 10 which is the first wiring and the metal wiring layer 11a which is the second wiring may be laminated with an insulating film interposed therebetween. In FIG. 5, a part laminated with the insulating film interposed is a laminated portion 12. Since the respective wirings are laminated with the insulating film interposed therebetween, each wiring is not electrically influenced by the other wiring. In addition, since the wirings are made in a laminated manner, the size of the semiconductor pressure sensor 1 can be further reduced.

<Pressure Sensor Device 100>

As shown in FIG. 9, the pressure sensor device 100 includes the semiconductor pressure sensor 1 configured as described above and a signal processing circuit 50. The signal processing circuit 50 processes the output of the first piezoresistance element 6 on the basis of the output of the first piezoresistance element 6 and the output of the second piezoresistance element 8. The signal processing circuit 50 performs a process of correcting the output of the first piezoresistance element 6 on the basis of a predetermined program, whereby accuracy of pressure measurement for hydrogen gas can be enhanced. The details of the processing will be described later.

The signal processing circuit 50 is composed of a processor 111 and a storage device 112, as shown in FIG. 10 which shows an example of hardware thereof. The storage device 112 is provided with a volatile storage device such as a random access memory, and a nonvolatile auxiliary storage device such as a flash memory, although not shown. Instead of the flash memory, an auxiliary storage device of a hard disk may be provided. The processor 111 executes a program inputted from the storage device 112. In this case, the program is inputted from the auxiliary storage device to the processor 111 via the volatile storage device. The processor 111 may output data such as a calculation result to the volatile storage device of the storage device 112, or may store such data into the auxiliary storage device via the volatile storage device.

<Outline of Correction Process>

The outline of the correction process for enhancing accuracy of pressure measurement for hydrogen gas will be described. The silicon oxide film 4 which is the joining part between the first silicon substrate 2 and the second silicon substrate 3 is exposed on a side surface of the semiconductor pressure sensor 1. Therefore, if pressure measurement for hydrogen gas and gas containing hydrogen gas is performed using the semiconductor pressure sensor 1, hydrogen penetrates through the silicon oxide film 4 serving as the penetration path and enters the inside of the second cavity 7, with increase in the measurement time. Subsequently, hydrogen inside the second cavity 7 passes through the silicon oxide film 4 at the joining part between the first recess 2b and the second recess 2c, to enter the inside of the first cavity 5. As hydrogen enters, the degrees of vacuum in the cavities serving as a reference for pressure measurement are reduced, so that offsets occur in the outputs of the first piezoresistance element 6 and the second piezoresistance element 8, and thus measurement accuracy is reduced. The correction process is performed using occurrence of a difference between the pressures in the first cavity 5 and the second cavity 7 due to penetration of hydrogen. By detecting the pressure difference and performing correction, it becomes possible to accurately measure the absolute pressure of hydrogen gas.

In pressure measurement for hydrogen gas using the semiconductor pressure sensor a case of correcting the output, result of the first piezoresistance element 6 on the basis of the output results of the first piezoresistance element 6 and the second piezoresistance element 8, and a case of not performing the correction, will be described with reference to FIG. 6. FIG. 6 shows the variation amount of the output of the semiconductor pressure sensor 1 from the initial value, and shows a result when the outside environment is such that the hydrogen pressure is 600 kPa, the hydrogen concentration is 100%, and the temperature is 100° C. In pressure measurement shown in FIG. 6, the allowable range of the variation amount of the sensor output is indicated by broken lines. When hydrogen gas enters the inside of the cavity and the pressure in the cavity increases so that the variation amount of the sensor output exceeds the allowable range, the sensor output needs to be corrected. In the case of not performing the correction in FIG. 6, when hydrogen gas penetrates through the penetration path from the side surface of the semiconductor pressure sensor 1, the pressure in the first cavity 5 increases, and the variation amount of the output of the first piezoresistance element 6 which is the sensor output increases over time. Meanwhile, in the signal processing circuit 50, the change amount of the pressure in the first cavity 5 can be estimated using the output results of the first piezoresistance element 6 and the second piezoresistance element 8. In the case of performing the correction in FIG. 6, the sensor output is corrected on the basis of estimation of the change amount of the pressure in the first cavity 5, whereby a result in which variation in the sensor output is suppressed can be obtained.

<First Recess 2b and Second Recess 2c>

In the present embodiment, as shown in FIG. 1, the first recess 2b is formed in a rectangular shape with sides having equal lengths, and the second recess 2c is formed in a rectangular loop shape in which the sides of the outer periphery have equal lengths and the sides of the inner periphery have equal lengths, as seen in the direction perpendicular to the main surface 3a of the second silicon substrate 3. In a case where the thickness of the second silicon substrate 3 forming the diaphragms 9a, 9b is 20 μm, for example, the length of one side of the first recess 2b is 400 μm, and the width of the partial area 2c1 of the second recess 2c (width indicated by the arrow in FIG. 1) is 300 μm. That is, the width of each of the four partial areas 2c1 is 0.75 times the length of one side of the first recess. In this case, the diaphragm 9a in the area where the first piezoresistance element 6 is formed and the diaphragm 9b in the area where the second piezoresistance element 8 is formed can obtain sufficient strains that enable the respective resistance value changes of the first piezoresistance element 6 and the second piezoresistance element 8 to be used in the same degree. Thus, the output voltages of the first piezoresistance element 6 and the second piezoresistance element 8 can be easily detected.

In a case where the width of the partial area 2c1 of the second recess 2c is halved, the degree of strain in the diaphragm 9b at the part where the second piezoresistance element 8 is located becomes about 1/10 as compared to the case where the width is 0.75 times. In a case where the width of the partial area 2c1 is equal to the length of one side of the first recess 2b, the degree of strain in the diaphragm 9b at the part where the second piezoresistance element 8 is located becomes about 2 times as compared to the case where the width is 0.75 times. The greater the width of the partial area 2c1 of the second recess 2c is, the greater the pressure sensitivity of the diaphragm 9b can be made. However, from the standpoint of reducing the size of the semiconductor pressure sensor 1, it is preferable that the width of the partial area 2c1 is not greater than the length (e.g., 400 μm) of each side of the first recess 2b.

In order to obtain sufficient strain that enables the resistance value change of the second piezoresistance element 8 to be used in more than the same degree as the first piezoresistance element 6, it is desirable that the width of each of the four partial areas 2c1 is greater than 0.75 times the length of one side of the first recess 2b. In the case of such a configuration, when the main surface 3a of the second silicon substrate 3 receives an outside pressure, the strain amount the part where the second piezoresistance element 8 is formed in the main surface 3a of the second silicon substrate 3 can be greater than the strain amount at the part where the first piezoresistance element 6 is formed. By increasing the strain amount at the part where the second piezoresistance element 8 is formed, it is possible to accurately detect the pressure in the second cavity 7 which hydrogen gas first enters through the penetration path inside the semiconductor pressure sensor 1. By accurately detecting the pressure in the second cavity 7, the absolute pressure of the hydrogen gas can be measured accurately.

The magnitude of strain in the diaphragm 9b is approximately determined by the width of the partial area 2c1, but if the distance between the first recess 2b and the second recess 2c is extremely small, strains in the diaphragm 9a and the diaphragm 9b interfere with each other. In the case of dimensions of the first recess 2b and the second recess 2c set in the present embodiment, the distance between the first recess 2b and the second recess 2c is set to 10 μm or greater, whereby strain interference between the diaphragm 9a and the diaphragm 9b has been successfully inhibited.

<Penetration of Hydrogen Gas>

The relationship between penetration of hydrogen gas and each part of the semiconductor pressure sensor 1 will be described. FIG. 7 shows the relationship of changes in the internal pressures of the first cavity 5 and the second cavity 7 due to penetration of hydrogen gas, and shows a result when the outside environment is such that the hydrogen pressure is 600 kPa, the hydrogen concentration is 100%, and the temperature is 100° C. The left vertical axis in FIG. 7 indicates the value of the internal pressure of the first cavity 5 converted from the output of the first piezoresistance element 6 provided adjacently to the first cavity 5. The horizontal axis in FIG. 7 indicates the value of the internal pressure of the second cavity 7 converted from the output of the second piezoresistance element 8 provided adjacently to the second cavity 7. The right vertical axis in FIG. 7 indicates the ratio between the internal pressures of the first cavity 5 and the second cavity 7.

Hydrogen gas passes through the penetration path from the side surface of the semiconductor pressure sensor 1, and enters the inside of the semiconductor pressure sensor 1 in the order of the second cavity 7 and then the first cavity 5. As the hydrogen gas enters, the change amount of the internal pressure of the second cavity 7 increases, and accordingly, the internal pressure of the first cavity 5 changes with some delay, as is found from the relationship in FIG. 7. The relationship in FIG. 7 can be arbitrarily adjusted by changing parameters such as the volumes of the cavities, the joining area between the first silicon substrate 2 and the second silicon substrate 3, and the thickness of the silicon oxide film 4. The relationship of these needs to be appropriately set in accordance with the outside environment in usage and the range of the pressure to be measured. The parameters will be described.

Regarding cavity volumes, from the standpoint of reducing change in the internal pressure of the cavity due to entry of by hydrogen gas, it is preferable that the volumes of the first cavity 5 and the second cavity 7 are great. Further, if the volume of the second cavity 7 is increased, change in the hydrogen concentration in the second cavity 7 due to hydrogen penetration from the outside environment becomes small, so that the amount of hydrogen penetration to the first cavity 5 can be reduced. On the other hand, in a case where the amount of hydrogen penetration into the cavity is small, for example, if the volume of the second cavity is reduced, sensitivity for change in the internal pressure of the second cavity 7 with respect to the amount of hydrogen penetration can be improved. Since sensitivity for change in the internal pressure of the second cavity 7 is improved, penetration of a smaller amount of hydrogen gas can be detected accurately. Thus, it becomes possible to more accurately correct variation in the sensor output even when a small amount of hydrogen gas penetrates. In order to reduce the volume, it is necessary to reduce the depth of the cavity or the outer shape of the cavity as seen in the direction perpendicular to the main surface 3a of the second silicon substrate 3. It is noted that, since the size of the cavity influences the magnitude of strain in the diaphragm, the size of the cavity cannot be reduced extremely.

Regarding the joining area between the first silicon substrate 2 and the second silicon substrate 3, if the joining area is greater, the length of the penetration path through which hydrogen penetrates becomes greater, so that change in the internal pressure of the cavity is reduced. On the other hand, if the area of the joining part between the first silicon substrate 2 and the second silicon substrate 3 on the outer side from the second cavity 7 is made small, it is possible to improve sensitivity for change in the internal pressure of the second cavity 7 with respect to the hydrogen penetration amount, as in the case of the cavity volume described above. Since sensitivity for change in the internal pressure of the second cavity 7 is improved, penetration of a smaller amount of hydrogen gas can be detected accurately. Thus, it becomes possible to more accurately correct variation in the sensor output even when a small amount of hydrogen gas penetrates.

Regarding the thickness of the silicon oxide film 4, from the standpoint of reliability in joining between the first silicon substrate 2 and the second silicon substrate 3, the thickness is set to about 1 μm. It is possible to reduce the hydrogen penetration amount by reducing the thickness of the silicon oxide film 4 within such a range that the surface-inside uniformity at the joining part is not lost.

As described above, by changing each parameter such as the cavity volume, the joining area between the first silicon substrate 2 and the second silicon substrate 3, or the thickness of the silicon oxide film 4, it is possible to adjust change in the internal pressure of the cavity due to penetration of hydrogen gas. It is preferable that the parameters are set appropriately in consideration of the diaphragm thickness, the outside environment in usage of the semiconductor pressure sensor 1, and the range of the pressure to be measured.

<Correction Process>

Correction for the output of the first piezoresistance element 6 when hydrogen gas enters through the penetration path will be described. First, trimming is performed using a reference pressure so that each output of the first piezoresistance element 6 and the second piezoresistance element 3 becomes a predetermined initial our value. Through the trimming, the outputs of the first piezoresistance element 6 and the second piezoresistance element 8 become equal to each other. The trimming is electrically performed in the signal processing circuit 50, for example, but is not limited thereto. The trimming may be performed by laser trimming in which the resistance values of the first piezoresistance element 6 and the second piezoresistance element 8 are adjusted using a laser.

In a case where the semiconductor pressure sensor 1 is placed in a hydrogen atmosphere, the diffusion coefficient (penetration rate) of hydrogen gas depends on the materials and the shapes of the joining part between the first silicon substrate 2 and the second silicon substrate 3, the diaphragms, and the like. Penetration of hydrogen gas starts from the second cavity 7. Then, the hydrogen gas inside the second cavity 7 enters the inside of the first cavity 5, and thus the internal pressures of the first cavity 5 and the second cavity 7 are changed. In the present embodiment, the silicon oxide film 4 is a main penetration path for hydrogen gas, and therefore the penetration amount of hydrogen gas in the second cavity 7 is always larger than the penetration amount of hydrogen gas in the first cavity 5. As a result, the first piezoresistance element 6 and the second piezoresistance element 8 respectively output values corresponding to different internal pressures depending on the penetration amounts of hydrogen gas, as shown in FIG. 7.

The variation amount of the internal pressure of the first cavity 5 due to hydrogen gas can be estimated from the ratio between the outputs of the first piezoresistance element 6 and the second piezoresistance element 8, and the value of the internal pressure of the first cavity 5 converted from the output of the first piezoresistance element 6. By correcting the measured value of the pressure using the estimated variation amount of the internal pressure, variation in the internal pressure due to the penetrating hydrogen gas can be canceled out. Since variation in the internal pressure due to hydrogen gas is canceled out, accuracy of pressure measurement for hydrogen gas can be enhanced.

A specific example of the correction will be described below. FIG. 8 is a graph obtained by plotting the variation amount of the internal pressure of the first cavity 5 with respect to the ratio between the internal pressures of the first cavity 5 and the second cavity 7 on the basis of FIG. 7, and shows a result when the outside environment is such that the hydrogen pressure is 600 kPa, the hydrogen concentration is 100%, and the temperature is 100° C. In a case where the semiconductor pressure sensor 1 was placed for 10000 hours in the above hydrogen atmosphere, the value of the internal pressure of the first cavity 5 converted from the output of the first piezoresistance element 6 provided adjacently to the first cavity 5 was 600.65 kPa, and the value of the internal pressure of the second cavity 7 converted from the output of the second piezoresistance element 8 provided adjacently to the second cavity 7 was 606.1 kPa. The ratio between the outputs of the first piezoresistance element 6 and the second piezoresistance element 8 was 1.009. From FIG. 8, the variation amount of the internal pressure of the first cavity 5 when the output ratio is 1.009 can be estimated to be 0.65 kPa, and therefore the true pressure value in pressure measurement can be calculated as 600 kPa.

In the above, the example in which the hydrogen pressure in the outside environment is constant at 600 kPa has been shown. However, even in a case where the hydrogen pressure varies, the variation amount of the internal pressure of the first cavity 5 can be estimated in the same manner from the vertical axis in FIG. 8. The ratio between the outputs of the first piezoresistance element 6 and the second piezoresistance element 8 shown here is merely an example. By setting the cavity volumes, the joining area between the first silicon substrate 2 and the second silicon substrate 3, or the like as appropriate and maximizing the change amount of the output ratio with respect to the pressure measurement accuracy (variation amount) that is desired, accuracy of the correction can be further enhanced. In the configuration of the present embodiment, conventional designing for a semiconductor pressure sensor can be utilized, and thus increase in cost for materials and manufacturing can be suppressed. Further, it becomes possible to correct the sensor output with a simple configuration using diaphragms and piezoresistance elements, and thus the semiconductor pressure sensor 1 capable of accurately measuring the pressure of hydrogen gas or the like can be obtained.

<Manufacturing Method for Semiconductor Pressure Sensor 1>

The outline of the manufacturing method for the semiconductor pressure sensor 1 will be described with reference to FIG. 11. It is noted that a plurality of semiconductor pressure sensors 1 are simultaneously manufactured with a wafer that is a single crystal silicon substrate, but here, manufacturing of one semiconductor pressure sensor 1 will be described. The semiconductor pressure sensor 1 has a square shape with one side having a length of about 1 to 1.6 mm in a plan view. The diaphragm 9a has a square shape with one side having a length of about 400 µm. The manufacturing method for the semiconductor pressure sensor 1 includes a recess forming step (S11), an oxide film forming step (S12), a substrate joining step (S13), a diaphragm forming step (S14), a resistor forming step (S15), a wiring forming step (S16), and a dicing step (S17).

The recess forming step is a step of forming the first recess 2b and the second recess 2c on the main surface 2a of the first silicon substrate 2 by etching. In order to precisely form the shapes of the first cavity 5 and the second cavity 7, i.e., the shapes of the diaphragms 9a, 9b, it is preferable to use inductive coupled plasma-reactive ion etching (ICP-RIE) using the Bosch process. However, the etching method is not limited thereto, and the recesses may be formed by anisotropic wet etching using an etching solution such as potassium hydroxide (KOH) or tetramethylammium hydroxide (TMAH).

The depths of the first recess 2b and the second recess 2c relate to the volumes of the first cavity 5 and the second cavity 7. From the standpoint of reducing changes in the internal pressures of the cavities even if any gas such as hydrogen enters the cavities, it is preferable that the cavity volumes are great and the first recess 2b and the second recess 2c should be etched to be as deep as possible. By making the cavities deep, the cavity volumes are increased, whereby it is possible to reduce changes in the internal pressures of the cavities due to entry of hydrogen gas and the accompanying variations in the outputs of the first piezoresistance element 6 and the second piezoresistance element 8. However, deep etching increases a wafer working load and reduces the mechanical strength of the first silicon substrate 2. On the other hand, if the cavities are made shallow, the wafer working load is reduced and the degree of reduction in the mechanical strength of the first silicon substrate 2 becomes small. However, change in the internal pressure of each cavity due to hydrogen penetration relatively increases. In the present embodiment, the depths of the first recess 2b and the second recess 2c are set to 50 µm. It is noted that the depths of the first recess 2b and the second recess 2c can be freely set in consideration of the above advantages and disadvantages.

The oxide film forming step is a step of forming the silicon oxide film 4 on the main surface 2a of the first silicon substrate 2 through thermal oxidation. The silicon oxide film 4 is formed also on the surfaces of the first recess 2b and the second recess 2c. In general, in a case of silicon-on-insulator (SOI) wafer, an oxide film having a thickness of 0.1 µm to 1 µm is used at the wafer joining surface. As the thickness of the silicon oxide film 4 increases, the penetration sectional area of the penetration path for gas such as hydrogen increases, so that the gas more readily enters the insides of the second cavity 7 and the first cavity 5. On the other hand, if the thickness of the silicon oxide film 4 is small, there is a possibility that the surface-inside uniformity at the joining part between the first silicon substrate 2 and the second silicon substrate 3 is lost. The configuration of the present disclosure is not subjected to any constraints about the thickness of the silicon oxide film 4, and therefore the thickness used in a general SOI wafer may be applied. In the present embodiment, the thickness of the silicon oxide film 4 is set to 0.5 µm. In the present embodiment, the example in which the silicon oxide film 4 is formed on the main surface 2a of the first silicon substrate 2 has been shown. However, the silicon oxide film 4 may be formed on the main surface 3b of the second silicon substrate 3.

The substrate joining step is a step of joining the main surface 2a of the first silicon substrate 2 and the main surface 3b of the second silicon substrate 3 to each other. The joining is performed in vacuum with the silicon oxide film 4 interposed. As a result of the joining, the first cavity 5 and the second cavity 7 are formed. It is preferable that the joining is performed in an oxidizing atmosphere under a high temperature of about 1100° C. Depending on the proportion of the sum of the areas of the first recess 2b and the second recess 2c in the entire wafer area as seen in the direction perpendicular to the wafer surface on which the first recess 2b and the second recess 2c are formed, the joining temperature may be increased to about 1200° C., to further improve the joining strength.

The diaphragm forming step is a step of forming the diaphragms 9a, 9b by adjusting the thickness of the second silicon substrate 3. The partial areas of the second silicon substrate 3 that cover the first recess 2b and the second recess 2c correspond to the diaphragms 9a, 9b. Therefore, after the first silicon substrate 2 and the second silicon substrate 3 are joined, the thickness of the second silicon substrate 3 is adjusted in accordance with the range of the pressure to be measured. Specifically, the entire main surface 3a of the second silicon substrate 3 is ground and polished so as to reach a predetermined thickness, e.g., about 20 µm. The diaphragm forming step is needed because it is difficult to handle the second silicon substrate 3 having a small thickness of about 20 µm at the time of joining. Through this step, the diaphragms 9a, 9b having a predetermined thickness are formed.

The resistor forming step is a step of forming the first piezoresistance element 6 and the second piezoresistance element 8 in the main surface 3a of the second silicon substrate 3. The first piezoresistance element 6 and the second piezoresistance element 8 are respectively formed at the outer periphery parts of the diaphragms 9a, 9b. In the present embodiment as the first piezoresistance element 6, the first piezoresistance elements 6a, 6b, 6c, 6d are formed at the respective sides of the outer periphery of the rectangular first cavity 5 as seen in the direction perpendicular to the main surface 3a of the second silicon substrate 3. As the second piezoresistance element 8, the second piezoresistance elements 8a, 8b, 8c, 8d are formed at the positions inward of the respective outer peripheries of the four partial areas 2c1 and adjacent to the respective outer peripheries of the four partial areas 2c1, in the main surface 3a of the second silicon substrate 3, as seen in the direction perpendicular to the main surface 3a of the second silicon substrate 3. The first piezoresistance element 6 and the second piezoresistance element 8 are formed by performing ion implantation with impurities such as boron at the above-described positions in the main surface 3a of the second silicon substrate 3 and then performing heat treatment and the like.

The wiring forming step is a step of forming the diffused wiring layer 10, the metal wiring layer 11a, and the metal pad 11b at the main surface 3a of the second silicon substrate 3. The diffused wiring layer 10 is formed through ion implantation and the subsequent heat treatment. The metal wiring layer 11a and the metal pad 11b are formed by making films of Al, Al—Si, Al—Si—Cu, etc. through a method such as sputtering or electron beam deposition.

The dicing step is a step of separating the semiconductor pressure sensors 1 into individual pieces. At the stage of the wiring forming step, the semiconductor pressure sensor 1 shown in FIG. 1 can be obtained. Since a plurality of the semiconductor pressure sensors 1 are manufactured with the wafer, they are separated into individual pieces by dicing.

Application of the semiconductor pressure sensor 1 of the present disclosure is not limited to a vehicle provided with a fuel cell system. In a conventional vehicle provided with an engine, there have been efforts undertaken for improving combustion efficiency by a method such as mixing a small amount of hydrogen gas into sucked air using means of fuel reformation or the like. Therefore, the semiconductor pressure sensor 1 of the present disclosure is also suitable for application of measuring the pressure of such air containing hydrogen gas as described above.

As described above, in the semiconductor pressure sensor 1 according to the first embodiment, the first recess 2b and the second recess 2c surrounding the first recess 2b are formed on the main surface 2a of the first silicon substrate 2, the first cavity 5 is formed as a space surrounded by the first recess 2b and the main surface 3b of the second silicon substrate 3, the second cavity 7 is formed as a space surrounded by the second recess 2c and the main surface 3b of the second silicon substrate 3, the first piezoresistance element 6 is formed at a position overlapping the outer periphery of the first cavity 5 or a position inward of the outer periphery of the first cavity 5, and the second piezoresistance element 8 is formed at a position overlapping the outer periphery of the second cavity 7, position overlapping the inner periphery of the second cavity 7, or a position inward of the outer periphery and outward of the inner periphery of the second cavity 7. Therefore, when hydrogen gas penetrates through the silicon oxide film 4, a difference arises between the pressures in the first cavity 5 and the second cavity 7, and the difference between the pressures in the first cavity 5 and the second cavity 7 can be detected from the outputs of the first piezoresistance element 6 and the second piezoresistance element 8. Thus, accuracy of pressure measurement for hydrogen gas can be enhanced. In addition, the configurations of the cavities, the diaphragms, the wiring layers, and the like are not greatly changed from the conventional configurations, and therefore the cost for materials and manufacturing does not increase. Thus, it is possible to obtain the semiconductor pressure sensor 1 at low cost while keeping reliablity.

In a case where the first piezoresistance element 6 is formed at a position inward of the outer periphery of the first cavity 5 and adjacent to the outer periphery of the first cavity 5, and the second piezoresistance element 8 is formed at a position inward of the outer periphery of the second cavity 7 and adjacent to the outer periphery of the second cavity 7, the first piezoresistance element 6 and the second piezoresistance element 8 can be located at such positions that great strain can be obtained. Thus, accuracy of pressure measurement for hydrogen gas can be enhanced. The configuration may be made such that, when the main surface 3a of the second silicon substrate 3 receives an outside pressure, the strain amount at the part where the second piezoresistance element 8 is formed in the main surface 3a of the second silicon substrate 3 is greater than the strain amount at the part where the first piezoresistance element 6 is formed in the second silicon substrate 3. In this case, it is possible to accurately detect the pressure in the second cavity 7 which hydrogen gas first enters through the penetration path inside the semiconductor pressure sensor 1.

As seen in the direction perpendicular to the main surface 3a of the second silicon substrate 3, the first recess 2b may be formed in a rectangular shape, and the widths of the four partial areas 2c1 of the second recess 2c that are located outward of the respective sides of the first recess 2b and have lengths corresponding to the respective sides may be equal to each other. In addition, the second piezoresistance elements 8 may be formed at positions inward of the respective outer peripheries of the four partial areas 2c1 and adjacent co the respective outer peripheries of the four partial areas 2c1, in the main surface 3a of the second silicon substrate 3, as seen in the direction perpendicular to the main surface 3a of the second silicon substrate 3. Further, the widths of the four partial areas 2c1 may be greater than 0.75 times the length of one side of the first recess 2b. In this case, when the main surface 3a of the second silicon substrate 3 receives an outside pressure, the strain amount at the part where the second piezoresistance element 8 is formed in the main surface 3a of the second silicon substrate 3 can be greater than the strain amount at the part where the first piezoresistance element 6 is formed in the second silicon substrate 3.

In a case where the second recess 2c is formed in a rectangular loop shape as seen in the direction perpendicular to the main surface 3a of the second silicon substrate 3, it is possible to form the second recess 2c precisely and easily through the semiconductor process.

In a case where the first piezoresistance element 6 and the metal pad 11b are connected via the diffused wiring layer 10, since the diffused wiring layer 10 formed in the area of the diaphragm 9b is less influenced by stress due to deformation of the diaphragm 9b, the durability of wiring between the first piezoresistance element 6 and the metal pad lib can be improved and deterioration of the wiring over time can be suppressed. In a case where the second piezoresistance element 8 and the metal pad 11b are connected via the metal wiring layer 11a, is possible to easily make wiring through the semiconductor process for the metal wiring layer 11a which is not formed in the area of the diaphragm 9b.

In a case where the second piezoresistance element 8 and the metal pad 11b are connected via the diffused wiring layer 10, since the second piezoresistance element 8 is formed in the area of the diaphragm 9b and the wiring part around the second piezoresistance element 8 is readily influenced by stress due to deformation of the diaphragm 9b, the durability of the wiring between the second piezoresistance element 8 and the metal pad 11b can be improved and deterioration of the wiring over time can be suppressed. In addition, in a case where at least parts of the diffused wiring layer 10 which is the first wiring and the metal wiring layer 11a which is the second wiring are laminated with an insulating film interposed therebetween, the size of the semiconductor pressure sensor 1 can be further reduced.

The pressure sensor device 100 may include the semiconductor pressure sensor 1 and the signal processing circuit 50, and the signal processing circuit 50 may process the output of the first piezoresistance element 6 on the basis of the output of the first piezoresistance element 6 and the output of the second piezoresistance element 8. In this case, the process of correcting the output of the first piezoresistance element 6 can be performed, whereby accuracy of pressure measurement for hydrogen gas can be enhanced.

Second Embodiment

Figure 12:
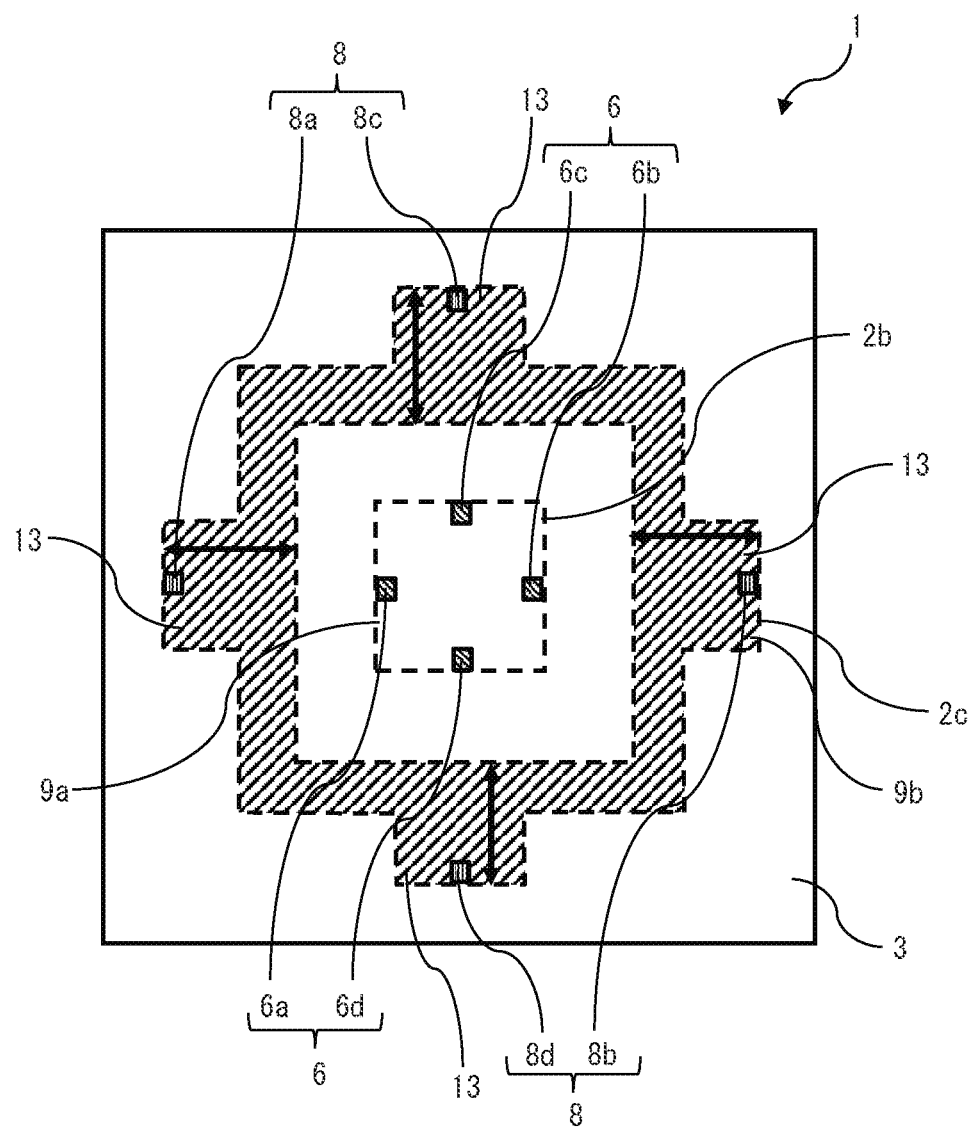
FIG. 12 is a plan view schematically showing a semiconductor pressure sensor according to the second embodiment of the present disclosure.

A semiconductor pressure sensor 1 according to the second embodiment of the present disclosure will be described. FIG. 12 is a plan view schematically showing the semiconductor pressure sensor 1 according to the second embodiment. The semiconductor pressure sensor 1 according to the second embodiment is different from the first embodiment in the shape of the second recess 2c as seen in the direction perpendicular to the main surface 3a of the second silicon substrate 3.

As seen in the direction perpendicular to the main surface 3a of the second silicon substrate 3, the first recess 2b is formed in a rectangular shape, and the second recess 2c is formed in a rectangular loop shape. The second recess 2c has four protruding parts 13 located outward of the respective sides of the first recess 2b and including shapes protruding outward from the rectangular loop shape part. The four protruding parts 13 are respectively formed to have at least the same lengths as the widths of the four protruding parts 13 (widths indicated by arrows in FIG. 12). The second piezoresistance elements 8 are formed at positions inward of the respective outer peripheries of the four protruding parts 13 and adjacent to the respective outer peripheries of the four protruding parts 13, in the main surface 3a of the second silicon substrate 3, as seen in the direction perpendicular to the main surface 3a of the second silicon substrate 3. The width of each of the four protruding parts 13 is greater than 0.75 times the length of one side of the first recess 2b. In the present embodiment, the width of the rectangular loop shape part excluding the four protruding parts 13 is not greater than 0.75 times the length of one side of the first recess 2b.

The area where sufficiently great strain should be obtained in the diaphragm 9b is the area where the second piezoresistance element 8 is formed and the surrounding area thereof. The outer side parts having at least the same lengths as the widths of the four protruding parts 13 in the second recess 2c are formed in shapes protruding outward from the rectangular loop shape part, whereby the area where sufficiently great strain should be obtained can be ensured in the diaphragm 9b. Therefore, the width of the rectangular loop shape part excluding the four protruding parts 13 can be made smaller than the widths of the four protruding parts 13 where the second piezoresistance elements 8 are provided. Owing to this configuration, it is possible to ensure a sufficient space for the metal wiring layer 11a and the metal pad 11b on the outer side from the width narrowed portion of the rectangular loop shape part. This allows flexible designing and enables accurate measurement for hydrogen gas without increasing the size of the semiconductor pressure sensor 1.

Since the width of the rectangular loop shape part excluding the four protruding parts 13 can be made smaller than the widths of the protruding parts 13 where the second piezoresistance elements 8 are provided, the joining area between the first silicon substrate 2 and the second silicon substrate 3 can be increased. Since the joining area between the first silicon substrate 2 and the second silicon substrate 3 is increased, the joining strength between the first silicon substrate 2 and the second silicon substrate 3 can be improved and the amount of hydrogen penetration through the joining part can be reduced.

Since the width of the rectangular loop shape part excluding the four protruding parts 13 is made smaller than the widths of the protruding parts 13 where the second piezoresistance elements 8 are provided, the volume of the second cavity 7 can be reduced. Since the volume of the second cavity 7 is reduced, the pressure in the second cavity 7 can more readily change with respect to the hydrogen penetration amount, and thus penetration of a smaller amount of hydrogen gas can be detected. Since penetration of a smaller amount of hydrogen gas can be detected, measurement accuracy for hydrogen gas can be improved. However, if the second cavity 7 in the area where the second piezoresistance element 8 is formed is extremely small, sufficiently great strain cannot be obtained in the diaphragm 9b. Therefore, it is preferable to secure at least a length equal to or greater than the width of the second cavity 7. In the present embodiment, it is important that a desired magnitude of strain is obtained, and any constraints such as symmetry are not particularly imposed on the shapes of the cavities and the diaphragms. Similarly, the piezoresistance elements may be located at any positions as long as sufficient outputs are obtained.

As described above, in the semiconductor pressure sensor 1 according to the second embodiment, as seen in the direction perpendicular to the main surface 3a of the second silicon substrate 3, the second recess 2c has four protruding parts 13 located outward of the respective sides of the first recess 2b and including shapes protruding outward from the rectangular loop shape part, the four protruding parts 13 respectively have at least the same lengths as the widths of the four protruding parts 13, and the widths of the four protruding parts 13 are greater than 0.75 times the length of one side of the first recess 2b. Thus, the area where sufficiently great strain should be obtained can be ensured in the diaphragm 9b, whereby the width of the rectangular loop shape part excluding the four protruding parts 13 can be made smaller than the widths of the four protruding parts 13 where the second piezoresistance elements 8 are provided. Since the width of the rectangular loop shape part excluding the four protruding parts 13 can be made smaller than the widths of the four protruding parts 13 where the second piezoresistance elements 8 are provided, the metal wiring layer 11a and the metal pad 11b can be located on the outer side from the width narrowed portion of the rectangular loop shape part, whereby the size of the semiconductor pressure sensor 1 can be reduced.

In a case where the widths of the four protruding parts 13 are greater than 0.75 times the length of one side of the first recess 2b and the width of the rectangular loop shape part excluding the four protruding parts 13 is not greater than 0.75 times the length of one side of the first recess, the strain amount at the part where the second piezoresistance element 8 is formed in the main surface 3a of the second silicon substrate 3 can be made greater than the strain amount at the part where the first piezoresistance element 6 is formed in the second silicon substrate 3, and also the size of the semiconductor pressure sensor 1 can be reduced.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 semiconductor pressure sensor
2 first silicon substrate
2a main surface
2b first recess
2c second recess
2c1 partial area
3 second silicon substrate
3a main surface
3b main surface
4 silicon oxide film
5 first cavity
6 first piezoresistance element
7 second cavity
8 second piezoresistance element
9a diaphragm
9b diaphragm
10 diffused wiring layer
11a metal wiring layer
11b metal pad
12 laminated portion
13 protruding part
50 signal processing circuit
100 pressure sensor device

What is claimed is:

1. A semiconductor pressure sensor comprising:
   a first semiconductor substrate;
   a second semiconductor substrate joined to one surface of the first semiconductor substrate with an oxide film interposed therebetween; and
   a first piezoresistance element and a second piezoresistance element provided in one surface of the second semiconductor substrate on a side opposite to the first semiconductor substrate, wherein
   a first recess and a second recess surrounding the first recess are formed on the one surface of the first semiconductor substrate, a first cavity is formed as a space surrounded by the first recess and an other surface of the second semiconductor substrate, and a second cavity is formed as a space surrounded by the second recess and the other surface of the second semiconductor substrate,
   the first piezoresistance element is formed at a position overlapping an outer periphery of the first cavity or a position inward of the outer periphery of the first cavity, in the one surface of the second semiconductor substrate, as seen in the direction perpendicular to the one surface of the second semiconductor substrate, and
   the second piezoresistance element is formed at a position overlapping an outer periphery of the second cavity, a position overlapping an inner periphery of the second cavity, or a position inward of the outer periphery and outward of the inner periphery of the second cavity, in the one surface of the second semiconductor substrate, as seen in the direction perpendicular to the one surface of the second semiconductor substrate.

2. The semiconductor pressure sensor according to claim 1, wherein
   the first piezoresistance element is formed at a position inward of the outer periphery of the first cavity and adjacent to the outer periphery of the first cavity, in the one surface of the second semiconductor substrate, as seen in the direction perpendicular to the one surface of the second semiconductor substrate, and
   the second piezoresistance element is formed at a position inward of the outer periphery of the second cavity and adjacent to the outer periphery of the second cavity, in the one surface of the second semiconductor substrate, as seen in the direction perpendicular to the one surface of the second semiconductor substrate.

3. The semiconductor pressure sensor according to claim 1, wherein
   when the one surface of the second semiconductor substrate receives an outside pressure, a strain amount at a part where the second piezoresistance element is formed in the one surface of the second semiconductor substrate is greater than a strain amount at a part where the first piezoresistance element is formed in the second semiconductor substrate.

4. The semiconductor pressure sensor according to claim 3, wherein
   as seen in the direction perpendicular to the one surface of the second semiconductor substrate,
   the first recess is formed in a rectangular shape,
   four partial areas of the second recess that are located outward of respective sides of the first recess and have lengths corresponding to the respective sides of the first recess, have widths equal to each other,
   the second piezoresistance elements are formed at positions inward of respective outer peripheries of the four partial areas and adjacent to the respective outer peripheries of the four partial areas, in the one surface of the second semiconductor substrate, as seen in the direction perpendicular to the one surface of the second semiconductor substrate, and
   a width of each of the four partial areas is greater than 0.75 times a length of one side of the first recess.

5. The semiconductor pressure sensor according to claim 4, wherein
   as seen in the direction perpendicular to the one surface of the second semiconductor substrate, the second recess is formed in a rectangular loop shape.

6. The semiconductor pressure sensor according to claim 3, wherein
   as seen in the direction perpendicular to the one surface of the second semiconductor substrate,
   the first recess is formed in a rectangular shape and the second recess is formed in a rectangular loop shape,
   the second recess has four protruding parts located outward of respective sides of the first recess and including shapes protruding outward from the rectangular loop shape,
   the four protruding parts respectively have at least the same lengths as widths of the four protruding parts,
   the second piezoresistance elements are formed at positions inward of respective outer peripheries of the four protruding parts and adjacent to the respective outer peripheries of the four protruding parts, in the one surface of the second semiconductor substrate, as seen in the direction perpendicular to the one surface of the second semiconductor substrate, and the width of each of the four protruding parts is greater than 0.75 times the length of one side of the first recess.

7. The semiconductor pressure sensor according to claim 6, wherein a width of the rectangular loop shape part excluding the four protruding parts is not greater than 0.75 times the length of one side of the first recess.

8. The semiconductor pressure sensor according to claim 1, further comprising a plurality of electrode pads provided at the one surface of the second semiconductor substrate, wherein the first piezoresistance element and the electrode pad are connected via first wiring made of a diffused resistor, and the second piezoresistance element and the electrode pad are connected via second wiring made of metal.

9. The semiconductor pressure sensor according to claim 8, wherein at least parts of the first wiring and the second wiring are laminated with an insulating film interposed therebetween.

10. The semiconductor pressure sensor according to claim 1, further comprising a plurality of electrode pads provided at the one surface of the second semiconductor substrate, wherein the first piezoresistance element and the electrode pad are connected via first wiring made of a diffused resistor, and the second piezoresistance element and the electrode pad are connected via second wiring made of a diffused resistor.

11. A pressure sensor device comprising:

the semiconductor pressure sensor according to claim 1; and a signal processing circuit for processing an output of the first piezoresistance element on the basis of the output of the first piezoresistance element and an output of the second piezoresistance element.

12. The semiconductor pressure sensor according to claim 1, wherein the second substrate forms a first diaphragm above the first cavity, and the second substrate forms a second diaphragm above the second cavity.

13. The semiconductor pressure sensor according to claim 12, wherein the first diaphragm is configured to measure a first pressure value using the first piezo element, and wherein the second diaphragm is configured to measure a second pressure value using the second piezo element.

14. The semiconductor pressure sensor according to claim 13, wherein the first pressure value and the second pressure value, considered together, provide an indication of a degree of hydrogen gas permeation into the first recess.

15. The semiconductor pressure sensor according to claim 13, wherein the first pressure value and the second pressure value, considered together, provide a correction of the first pressure value.

* * * * *